US009785427B2

(12) United States Patent
Hu et al.

(10) Patent No.: US 9,785,427 B2
(45) Date of Patent: Oct. 10, 2017

(54) ORCHESTRATION OF SOFTWARE APPLICATIONS UPGRADE USING CHECKPOINTS

(71) Applicant: Oracle International Corporation, Redwood Shores, CA (US)

(72) Inventors: Fang Hu, Dublin, CA (US); Chi Kin Vong, Chandler, AZ (US); Bhuvaneswari Thiagarajan, Fremont, CA (US); Tim Richardson, Queen Creek, AZ (US); Jinghuan Jay Lu, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/838,184

(22) Filed: Aug. 27, 2015

(65) Prior Publication Data

US 2016/0070558 A1    Mar. 10, 2016

Related U.S. Application Data

(60) Provisional application No. 62/046,811, filed on Sep. 5, 2014.

(51) Int. Cl.
*G06F 9/44* (2006.01)
*G06F 9/445* (2006.01)

(52) U.S. Cl.
CPC . *G06F 8/65* (2013.01); *G06F 8/61* (2013.01)

(58) Field of Classification Search
CPC .................................. G06F 8/61; G06F 8/65
USPC ................................................. 717/168, 174
See application file for complete search history.

(56) References Cited

U.S. PATENT DOCUMENTS

| 5,862,325 | A   |   | 1/1999  | Reed et al. |
|-----------|-----|---|---------|-------------|
| 6,088,717 | A   |   | 7/2000  | Reed et al. |
| 6,314,567 | B1  | * | 11/2001 | Oberhauser ............... G06F 8/67 717/170 |
| 6,360,366 | B1  |   | 3/2002  | Heath et al. |
| 6,633,899 | B1  | * | 10/2003 | Coward .................. G06F 9/542 709/202 |

(Continued)

OTHER PUBLICATIONS

What is Prevayler?, Prevayler, Version 2.6, http://prevayler.org/, Jan. 15, 2013, 1 page.

(Continued)

*Primary Examiner* — Phillip H Nguyen
(74) *Attorney, Agent, or Firm* — Kilpatrick Townsend & Stockton LLP

(57) ABSTRACT

Embodiments provide techniques for concurrently upgrading one or more software applications hosted by one or multiple hosts. Checkpoint data associated with the upgrade processes executing on the multiple hosts may be generated during the upgrade. The checkpoint data may be stored in a shared storage that can be accessed by the upgrade processes. Each upgrade process running on a host may be adapted to read checkpoint data from the shared storage and write checkpoint data only to a dedicated location on the shared storage. Checkpoint data written by a first upgrade process may be read by a second upgrade process to determine the status and/or progress of the first upgrade process on a given host. In this manner, the checkpoint data enable the multiple upgrade processes to synchronize with each other.

20 Claims, 8 Drawing Sheets

(56) References Cited

U.S. PATENT DOCUMENTS

| | | |
|---|---|---|
| 6,779,028 B1 | 8/2004 | Nakamura |
| 7,191,187 B2 | 3/2007 | Takeshita et al. |
| 7,457,880 B1* | 11/2008 | Kim .................. G06F 17/30171 709/216 |
| 7,584,467 B2 | 9/2009 | Wickham et al. |
| 7,739,677 B1* | 6/2010 | Kekre ................ G06F 11/1425 709/214 |
| 8,346,913 B2 | 1/2013 | Gao et al. |
| 8,589,535 B2 | 11/2013 | Calder et al. |
| 8,752,040 B2 | 6/2014 | Halliday |
| 9,032,053 B2* | 5/2015 | Kosuru ................ H04L 41/082 709/221 |
| 9,185,514 B1 | 11/2015 | Reeves et al. |
| 2003/0005351 A1 | 1/2003 | Lim |
| 2004/0003352 A1 | 1/2004 | Bargeron et al. |
| 2004/0010808 A1 | 1/2004 | deCarmo |
| 2004/0012613 A1 | 1/2004 | Rast |
| 2004/0030567 A1 | 2/2004 | Takeshita et al. |
| 2004/0044736 A1 | 3/2004 | Austin-Lane et al. |
| 2004/0103411 A1 | 5/2004 | Thayer |
| 2006/0010233 A1* | 1/2006 | Fellenstein .......... G06F 11/3414 709/224 |
| 2006/0015861 A1 | 1/2006 | Takata et al. |
| 2006/0218545 A1* | 9/2006 | Taguchi .................... G06F 8/67 717/168 |
| 2006/0240803 A1 | 10/2006 | Valeriano et al. |
| 2008/0133741 A1 | 6/2008 | Kubota |
| 2008/0168434 A1* | 7/2008 | Gee ........................... G06F 8/65 717/173 |
| 2008/0244555 A1* | 10/2008 | Welvaert ................... G06F 8/65 717/169 |
| 2008/0250405 A1* | 10/2008 | Farhangi .................... G06F 8/61 717/177 |
| 2009/0248801 A1 | 10/2009 | Then et al. |
| 2010/0125849 A1 | 5/2010 | Oswald et al. |
| 2010/0235823 A1 | 9/2010 | Garbers et al. |
| 2011/0289498 A1* | 11/2011 | Xie ............................ G06F 8/61 717/171 |
| 2012/0005316 A1 | 1/2012 | Perry et al. |
| 2012/0066380 A1 | 3/2012 | Gao et al. |
| 2012/0204171 A1 | 8/2012 | Reisman |
| 2013/0174178 A1 | 7/2013 | Chakraborty et al. |
| 2013/0263104 A1 | 10/2013 | Baset et al. |
| 2013/0291099 A1 | 10/2013 | Donfried et al. |
| 2013/0346922 A1 | 12/2013 | Shiplacoff et al. |
| 2014/0096076 A1 | 4/2014 | Ashbrook et al. |
| 2014/0189030 A1 | 7/2014 | Benchenaa et al. |
| 2014/0298196 A1 | 10/2014 | Aoyama et al. |
| 2014/0304714 A1 | 10/2014 | Shapiro |
| 2014/0317522 A1 | 10/2014 | Lucero et al. |
| 2015/0067819 A1 | 3/2015 | Shribman et al. |
| 2015/0178066 A1* | 6/2015 | Horn ........................ G06F 8/65 717/161 |
| 2015/0193222 A1 | 7/2015 | Pirzadeh et al. |
| 2015/0360239 A1 | 12/2015 | Yano et al. |
| 2016/0028667 A1 | 1/2016 | Faaborg et al. |
| 2016/0066145 A1 | 3/2016 | Pietraniec et al. |
| 2016/0092310 A1* | 3/2016 | Peacock .............. G06F 11/1441 714/23 |
| 2016/0124741 A1 | 5/2016 | Hu et al. |
| 2016/0132316 A1 | 5/2016 | Hu et al. |
| 2016/0132318 A1 | 5/2016 | Hu et al. |

OTHER PUBLICATIONS

U.S. Appl. No. 14/935,254, Non-Final Office Action mailed on Dec. 14, 2016, 16 pages.
U.S. Appl. No. 14/935,112, Notice of Allowance mailed on May 1, 2017, 15 pages.
U.S. Appl. No. 14/925,354, Notice of Allowance mailed on Apr. 12, 2017, 8 pages.
U.S. Appl. No. 14/925,354, Non-Final Office Action dated Oct. 20, 2016, 12 pages.
U.S. Appl. No. 14/935,112, Non-Final Office Action dated Oct. 25, 2016, 11 pages.
Dumitras et al., Why Do Upgrades Fail and What Can We Do about It? Toward Dependable, Online Upgrades in Enterprise System, IFIP International Federation for information Processing, 2009, pp. 349-372.
Greene, SCOM 2012—Configuring Application Performance Monitoring (APM) Part 3. IT Blog, http /lkevingreeneitblog. blogspot.com/2012/03/scom-2012-configuring-application_49. html, Mar. 2012, 9 pages.
Microsoft, Orchestration Suspended Instances Availability Monitor Monitor, http://mpwiki.viacode.com/default.aspx?g=posts&t=164367, Oct. 2013, 2 pages.
Vancauwenberghe, Monitoring suspended orchestrations using System Center Operations Manager, Codit Blog, Feb. 14, 2014, 8 pages.
U.S. Appl. No. 14/935,254, Final Office Action dated May 23, 2017, 19 pages.

* cited by examiner

ORCHESTRATION OF SOFTWARE APPLICATIONS UPGRADE USING CHECKPOINTS

CROSS-REFERENCES TO RELATED APPLICATIONS

This Application claims the benefit of and priority to U.S. Provisional Application No. 62/046,811, filed Sep. 5, 2014 and entitled "ORCHESTRATION OF SOFTWARE APPLICATIONS UPGRADE USING CHECKPOINTS," the entire contents of which are incorporated herein by reference for all purposes.

BACKGROUND

The term upgrading a software application generally refers to the process of replacing an existing version of the software application with a newer version, adding a new version of the software application where none previously existed, or somehow changing an existing version of the software application to a newer different version. A software upgrade may be performed for various reasons such as to add one or more features, remove one or more features, modify one or more features in an existing version of the software, remove bugs or errors, improve the software efficiency, and other reasons. An upgrade is generally performed to enhance the performance of a software application.

Many modern computing environments typically include a framework of multiple heterogeneous software applications, which may be developed by different third-party entities. The applications may run on or be hosted by multiple hosts in a distributed environment. The process of upgrading such applications is quite complicated due to factors such as the number of applications that need to be upgraded, the distributed nature of the applications, potential dependencies between the applications, customized upgrade requirements for individual applications, complication caused by the multiple hosts involved in the upgrade process and their configurations, and several other factors. Conventional upgrade systems struggle with such software upgrades and many times the upgrades have to be controlled and/or managed manually.

Given the complexity of performing software upgrades in a heterogeneous distributed computing environment, some software upgrade systems use checkpoints to orchestrate the upgrade process. For example, "Prevayler" open source software (http://prevayler.org/) provided by the Maven project provides an open source object persistence library that provides a thread-safe lightweight checkpointing solution for performing software upgrades. Prevayler is an implementation of the Prevalent System design pattern, in which business objects are kept live in memory and transactions are journaled for system recovery. Prevayler however only provides thread-safe checkpointing for a single Prevayler instance or process running on one host. When multiple Prevayler instances need to be used concurrently by multiple upgrade processes spanning different hosts, thread-safe solution can no longer guarantee the persistence. Consequently, Prevayler cannot be used in a multi-application multi-host environment and does not solve concurrency issues caused by multiple writing and reading application instances in a multi-host environment. A writing application instance tries to insert data to or update the transaction record, whereas a reading application instance tries to read data from the transaction record.

Some upgrade implementations use a database to provide persistence when coordinating upgrade activities among multiple hosts. However a database solution is too big and heavy, and requires high development efforts and high operating efforts. Furthermore, when upgrade flows have to be coordinated among different hosts, providing accessibility to a centralized database is typically not possible. Additionally, uninterrupted connectivity to any centralized database throughout the entire upgrade process (e.g., which could be spread over a long period of time, even several days) cannot be ensured.

BRIEF SUMMARY

The present disclosure relates generally to managing the upgrading of software applications running on multiple hosts. In certain embodiments, techniques are disclosed for enabling multiple software applications potentially running on multiple hosts to be upgraded using a novel scheme that enables each upgrade process running on a host to read and/or write checkpoint data on a shared storage accessible by the upgrade processes. Each upgrade process may read checkpoint data from the shared storage and write its checkpoint data to a dedicated checkpoint file stored on the shared storage.

In certain embodiments, one or more applications running or executing on multiple hosts may be upgraded concurrently. As part of the upgrade, checkpoint data associated with one or more upgrade processes executing on one or more of the multiple hosts may be generated. The checkpoint data may be stored in a shared storage that can be accessed by the upgrade processes. Each upgrade process running on a host may be adapted to read checkpoint data from the shared storage and write checkpoint data to a dedicated location on the shared storage. Checkpoint data written by a first upgrade process to a location dedicated to the first upgrade process may be read by a second upgrade process to determine the status and/or progress of the first upgrade process on a given host. In this manner, the checkpoint data enables the multiple hosts to synchronize, when needed, their upgrade processes with each other. The checkpoint data may also enable multiple upgrade processes running on a single host to be synchronized.

In certain embodiments, techniques (including methods, systems, code or software instructions executed by one or more processors) are provided for controlling execution of a first upgrade process on a first host machine for upgrading a first software application on the first host machine. A second upgrade process may be executed, for example, on a second host machine for upgrading a second software application on the second host machine. A shared storage is provided such that the shared storage is accessible by the first upgrade process and the second upgrade process. In certain embodiments, the shared storage may be provided on the first host machine or the second host machine. In another embodiment, the shared storage may be provided on a third host machine different from the first and second host machines. A first location is provided on the shared storage for the first upgrade process where the first upgrade process and not any other upgrade process including the second upgrade process is allowed to store information. The first upgrade process may store first checkpoint data in the first location. The first checkpoint data may comprise information indicative of a status of the first upgrade process. The first checkpoint data may be provided to the second upgrade process from the first location.

In some instances, the execution of the second upgrade process may be modified based on the first checkpoint data written by the first upgrade process. For example, the modifying may include pausing the execution of the second upgrade process until the first upgrade process reaches a pre-determined checkpoint.

In certain embodiments, it may be determined that the execution of the first upgrade process is stopped at a first execution point. A portion of the first checkpoint data which is generated at the first execution point and written to the first location may be retrieved from the first location and provided to the first upgrade process, i.e. the same upgrade process. The execution of the first upgrade process may be resumed from the first execution point based on the retrieved portion of the first checkpoint data.

In certain embodiments, a second location may also be provided on the shared storage for the second upgrade process where only the second upgrade process and no other upgrade process including the first upgrade process is allowed to store information. For example, second checkpoint data generated by the second upgrade process may be stored at the second location corresponding to the second upgrade process on the shared storage. The second checkpoint data may include information indicative of a status of the second upgrade process. In some embodiments, the second checkpoint data may retrieved from the second location and provided to the first upgrade process. The second upgrade process may be prevented from modifying contents and attributes of the first location. Similarly, the first upgrade process may be prevented from modifying contents and attributes of the second location.

In certain embodiments, the second upgrade process may be granted access to the first location to read the first checkpoint data before the first upgrade process writes the first checkpoint data to the first location. The second upgrade process may determine that the first location is empty. For example, in one scenario, the first upgrade process may be in the process of writing data to the first location but may not have completed the writing operation. Alternatively, the first process may not yet have started writing data in the first location. The second upgrade process may wait for a pre-determined amount of time and then re-access the first location to read the first checkpoint data after the pre-determined amount of time has passed. In this manner, the second upgrade process may read the first checkpoint data after the first upgrade process finishes writing first checkpoint data in the first location. The second upgrade process may be prevented from reading the first checkpoint data before the first upgrade process writes the first checkpoint data to the first location, wherein the second upgrade process determines that the first location is empty.

In certain embodiments, techniques (including methods, systems, code or software instructions executed by one or more processors) are provided for accessing, by a first upgrade process, a location on a shared storage to read checkpoint data. A second upgrade process may write the checkpoint data to the location on the shared storage. The checkpoint data may be indicative of a status of the second upgrade process. The first upgrade process may be prevented from storing data at the location on the shared storage. The first upgrade process may determine that the checkpoint data is missing from the location. The first upgrade process may be prevented from changing an attribute of the location to indicate that the checkpoint data is missing. The first upgrade process may re-access the location to read the checkpoint data after a pre-determined amount of time. That is, the first upgrade process may read the checkpoint data after the second upgrade process finishes writing the checkpoint data to the location.

These and other embodiments are described in further detail below.

BRIEF DESCRIPTION OF THE DRAWINGS

Illustrative embodiments of the present invention are described in detail below with reference to the following drawing figures.

DETAILED DESCRIPTION

Figure 1:
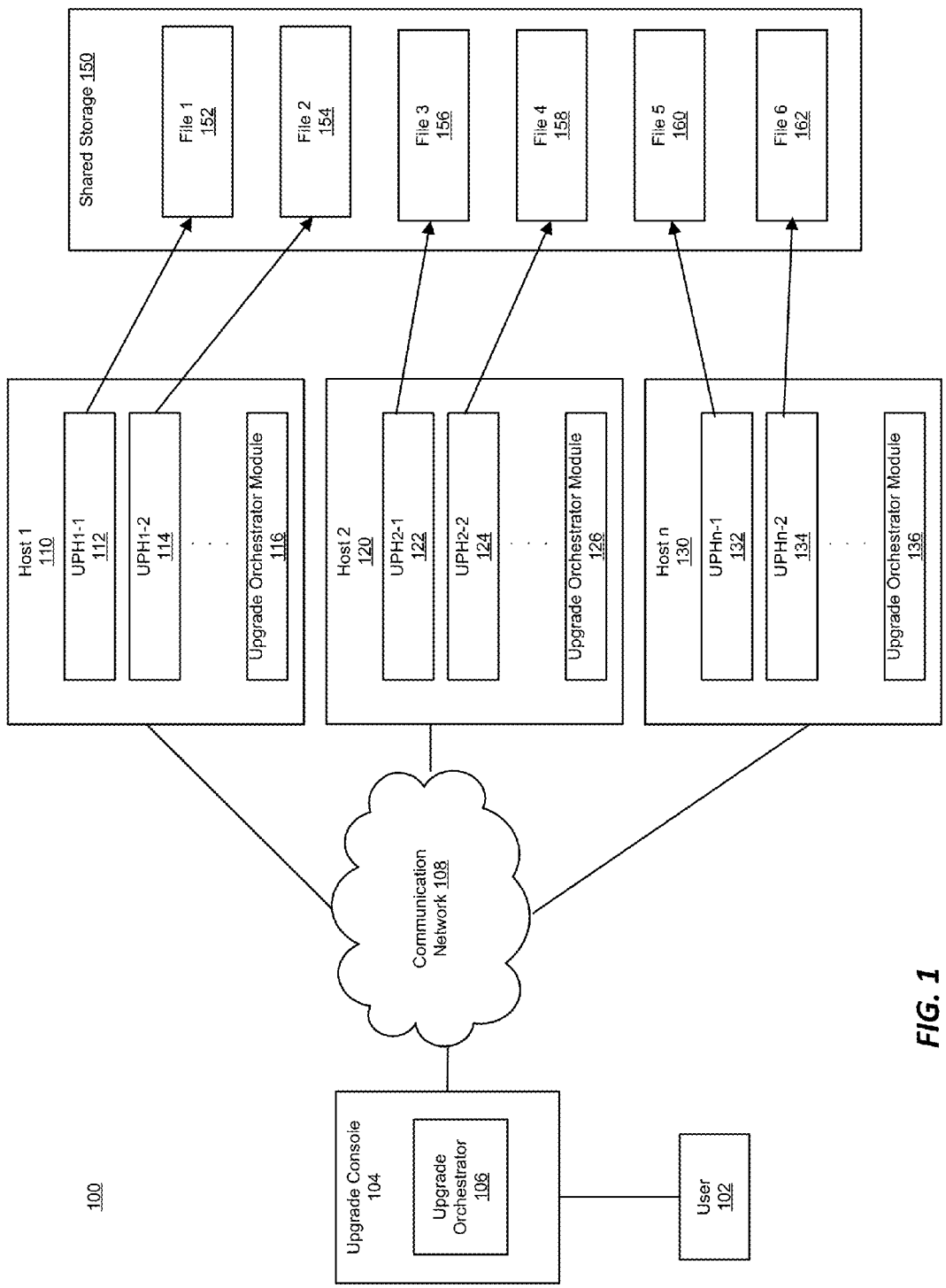
FIG. 1 depicts an upgrade infrastructure for executing multiple upgrade processes on multiple hosts according to an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks.

The present disclosure relates generally to managing the process of upgrading software applications running on multiple hosts. In certain embodiments, techniques are disclosed for enabling multiple software applications potentially running on multiple hosts to be upgraded using a novel scheme that enables each upgrade process running on a host to read checkpoint data from a shared storage and/or write its checkpoint data to a dedicated checkpoint file stored on the shared storage.

In accordance with various embodiments, an upgrade computing infrastructure is provided that enables multiple software applications executing on multiple hosts to be upgraded in an efficient manner. In some embodiments, one or more upgrade processes executing on one host machine, and which are responsible for performing upgrade tasks on that host, can be synchronized, if needed, with upgrade processes executing on the same host or with upgrade processes executing on other hosts.

An upgrade process running on a host may be configured to upgrade one or more software applications on that host. Upgrading a software application may include replacing an existing version of the software application with a newer version, adding a new version of the software application where none previously existed, or somehow changing an existing version of the software application to a newer different version. The upgrade processes may add one or more features, remove one or more features, modify one or more features from an existing version of the applications, remove bugs or errors, improve the software efficiency, and the like.

A host, as used herein, refers to any computing device or machine comprising one or more processors. Various different software applications may be hosted by the hosts in a distributed environment. A host may host and/or execute one or more software applications. The software applications may include, various types of applications, such as enterprise resource planning software applications that can be used to collect, store, manage, process, analyze and interpret data from many business activities, customer relationship management (CRM) applications, supply chain management applications, or the like. The same application may be hosted by multiple hosts. Different versions of an application may be hosted by different hosts.

The software applications hosted by the hosts may be developed by different third-party entities. Due to the heterogeneity of the software applications and further coupled with the distributed nature of the computing environment, the process of upgrading such applications is quite complicated. In certain embodiments, the overall upgrade of upgrading multiple applications across multiple hosts comprises running one or multiple software upgrade processes on each of the hosts for upgrading the various pieces of software applications hosted by that host. The complexity of performing and managing such a distributed upgrade process is impacted by several factors such as the number of applications that need to be upgraded, the distributed nature of the applications, potential upgrade dependencies between upgrade processes for the applications hosted by the same or different hosts, customized upgrade requirements for individual applications, the number of hosts involved in the upgrade, and other factors.

According to an embodiment of the present invention, an upgrade infrastructure is provided that enables software upgrades to be performed in a heterogeneous and distributed computing environment in an automated and efficient manner. The upgrade infrastructure enables two or more upgrade processes running on the same host or running on multiple different hosts to synchronize and coordinate their upgrade activities in an automated manner. In certain embodiments, the upgrade infrastructure provides a shared storage area that can be accessed, for reading or writing, by the various upgrade processes running on the host(s). A dedicated location is assigned on the shared storage to each upgrade process for writing checkpoint data for that upgrade process. In certain embodiments, the shared storage is configured such that, for a storage location dedicated or assigned to a particular upgrade process, only that particular upgrade process is able to write or store its checkpoint data to that location; the other upgrade processes are not allowed to write or store data to that location. The checkpoint data written to the dedicated location by the particular upgrade process can however be read by the other upgrade processes.

While performing an upgrade, an upgrade process may, from time to time, write checkpoint data to its assigned location. The checkpoint data for a upgrade process may comprise information indicative of the upgrade status of that particular upgrade process. This checkpoint data may then be read by other upgrade processes running on the same host as the upgrade process that wrote the data or running on other distributed hosts. The combination of the ability of the upgrade processes to write checkpoint data only to their dedicated locations on the shared storage and the ability of the various upgrade processes to read the checkpoint data written by other upgrade processes enables the various upgrade processes to coordinate and synchronize each other's upgrade activities, when needed, in an automated manner.

The shared storage may be provided in various different ways. In one embodiment, the shared storage may be provided on a central host that can be accessed by all the upgrade processes participating in the overall upgrade and executing on the various hosts. In some embodiments, the shared storage can also be provided on one of the multiple hosts participating in the upgrade process provided that the shared storage is accessible by all the upgrade processes executing on all the hosts.

FIG. 1 illustrates an exemplary upgrade infrastructure (e.g. upgrade system) 100 according to certain embodiments. The upgrade infrastructure 100 includes multiple hosts 110, 120, 130. The hosts 110, 120, 130 may host one or multiple software applications. When these software applications are to be upgraded, multiple upgrade processes 112, 114, 122, 124, 132, 134 may be executed by the hosts 110, 120, 130 to upgrade the software applications hosted by the hosts 110, 120, 130. In certain embodiments, one or more hosts may be grouped into a group, which may be referred to as a pod. A pod, as used herein, defines a modular set of resources including, for example, a specific set of infrastructure, middleware, and/or application resources such as a group of hosts.

In the embodiment depicted in FIG. 1, the upgrade infrastructure 100 includes an upgrade console 104 in communication with the hosts 110, 120, 130 through a communication network 108. The upgrade console 104 may be a computing system that a user 102 (e.g. a system administrator) may use to initiate and control the overall upgrade and to monitor and control the upgrade processes executed by the hosts 110, 120, 130 as part of the over upgrade process. In certain embodiments, the upgrade console 104 may include an upgrade orchestrator 106 for initiating, coordinating and synchronizing the upgrade processes 112, 114, 122, 124, 132, 134 running on the hosts 110, 120, 130. Status information related to the overall upgrade and status of the upgrade processes running on the individual hosts as part of the overall upgrade may be output to the user via upgrade console 104.

In certain embodiments, the overall upgrade may be performed in phases. During each phase, multiple upgrade processes may run on the hosts 110, 120, 130. The upgrade orchestrator 106 may ensure that a current set of upgrade processes run to successful completion on all hosts before proceeding with the next set of upgrade processes corresponding to the next phase. One of ordinary skill in the art will appreciate that the upgrade infrastructure 100 may include any number of components, hosts and upgrade processes. Thus, the upgrade infrastructure 100 is not limited to the components, hosts and upgrade processes illustrated in FIG. 1.

As illustrated in FIG. 1, multiple upgrade processes may run on each one of the hosts 110, 120, 130. For example, upgrade processes 112, 114 may run on host 110 for upgrading one or more applications on host 110, upgrade processes 122, 124 may run on host 120 for upgrading one or more applications on host 120, upgrade processes 132, 134 may run on host 130 for upgrading one or more applications on host 130, and so on. In some embodiments, the upgrade processes 112, 114, 122, 124, 132, 134 may be serialized across hosts. In other embodiments, two or more of the upgrade processes 112, 114, 122, 124, 132, 134, on a host or across hosts, may run in parallel. The two or more of the upgrade processes may synchronize using a dedicated upgrade orchestrator module 116, 126, 136 executed on each host 110, 120, 130, respectively. Each upgrade orchestrator module 116, 126, 136 may be a piece of code running on the host 110, 120, 130 for initiating and overseeing the execution of the upgrade processes 112, 114, 122, 124, 132, 134 on the hosts 110, 120, 130. The upgrade orchestrator modules 116, 126, 136 may receive and/or respond to commands and instructions from the upgrade console 104 to control the upgrade on the hosts 110, 120, 130.

The upgrade infrastructure 100 includes a shared storage 150 accessible by the upgrade processes executing on the various hosts involved in the overall upgrade. For example, shared storage 150 is accessible by upgrade processes 112, 114, 122, 124, 132, 134 executed by hosts 110, 120, 130. In one embodiment, the shared storage 150 may be provided on a central host that is accessible by the upgrade processes 112, 114, 122, 124, 132, 134. In certain embodiments, the central host may be one of the hosts 110, 120, 130 on which upgrades are being performed and which is accessible by the upgrade processes 112, 114, 122, 124, 132, 134. In some embodiments, the shared storage 150 may be provided on a separate machine or host, separate from the hosts on which upgrades are being performed.

In certain embodiments, each upgrade process running on a host is configured to write its checkpoint data to the shared storage 150. The checkpoint data may include data associated with the upgrade status (i.e. state) of the upgrade process at the time the upgrade process writes the checkpoint data. The checkpoint data written by one upgrade process can be read by the other upgrade processes from the shared storage 150.

The checkpoint data may comprise information providing a snapshot of the state or progress of the upgrade process writing the checkpoint data. Reading the checkpoint data thus enables the upgrade process reading the checkpoint data to determine the status or progress of the upgrade process that wrote that checkpoint data. In this manner, the writing and reading of checkpoint data enables the upgrade processes (e.g., processes 112, 114, 122, 124, 132, 134) to determine the state or progress of other upgrade processes executing locally (i.e., upgrade processes running on the same host) or remotely (i.e., upgrade processes executing on other hosts). In this manner, the checkpoint data enables the upgrade processes to be state-aware. That is, any one of the upgrade processes 112, 114, 122, 124, 132, 134 may stop or pause at a stopping/pausing point, and commence execution from the stopping/pausing point using the checkpoint data of that upgrade process saved at the stopping/pausing point. This way, the upgrade process may resume execution without losing data at the stopping/pausing point.

The checkpoint data also enables two or more upgrade processes to synchronize and/or coordinate their upgrade activities with one another. Using the checkpoint data, the upgrade processes 112, 114, 122, 124, 132, 134 may determine the state or progress of other upgrade processes, either local (i.e. running on the same host) or remote (i.e. running on other hosts). An upgrade process may synchronize or coordinate its executing with other one or more upgrade processes running on the same host and/or on different hosts.

In certain embodiments, based upon the checkpoint data written by the one or more upgrade processes involved in the overall upgrade, the status and progress of the overall upgrade may be determined and controlled. For example, in one scenario, the overall upgrade may be stopped or paused or discontinued upon detecting certain conditions based upon the checkpoint data. For example, the upgrade infrastructure may prevent the overall upgrade from continuing unless all the involved upgrade processes reach a given checkpoint. This way, if there is an error with a particular upgrade process involved in the overall upgrade, other upgrade processes also executing as part of the overall upgrade are prevented from proceeding as the overall upgrade may eventually fail and/or need to be commenced again.

As described above, an upgrade process can write checkpoint information to shared storage 150 that can then be read by other upgrade processed. In certain embodiments, each upgrade process assigned a dedicated location on the shared storage 150 for writing its checkpoint data. The shared storage 150 is configured such that for a location assigned to a particular upgrade process, only that particular upgrade process can write or store information to that dedicated stored location, i.e., no other upgrade process can write or store information to that location. The other upgrade processes are however allowed to read the checkpoint information written to the storage location by the particular upgrade process.

For example, for the embodiment depicted in FIG. 1, dedicated locations on shared storage 150 may be provided for the various upgrade processes 112, 114, 122, 124, 132, and 134 running on hosts 110, 120, and 130. In one embodiment, the storage locations may be manifested in the form of files that are dedicated to the upgrade processes. For example, file 152 on shared storage 150 may be provided for upgrade process 112 and represents the dedicated location assigned to upgrade process 112. Only upgrade process 112 running on host 110 is allowed to write or store its checkpoint data to this dedicated location file 152. No other upgrade process, whether running locally on host 110 (e.g., upgrade process 114) or running remotely (e.g., upgrade processes 122, 124, 132, 134) may write to file 152. The other upgrade processes are however allowed to read the checkpoint data written to file 152 by upgrade process 112. In a similar manner, as depicted in FIG. 1: file 154 on shared storage 150 may be assigned to upgrade process 112 and represents the dedicated location assigned to upgrade process 114; file 156 may be assigned to upgrade process 122 and represents the dedicated location assigned to upgrade process 122; file 158 may be assigned to upgrade process 124 and represents the dedicated location assigned to upgrade process 124; file 160 may be assigned to upgrade process 132 and represents the dedicated location assigned to upgrade process 132; and file 162 may be assigned to upgrade process 134 and represents the dedicated location assigned to upgrade process 134. In this manner, each upgrade process involved in the overall upgrade is given write access to a dedicated location assigned to that upgrade process on the shared storage. In certain embodiments, each upgrade process is assigned as the owner of the dedicated location on the shared storage where that upgrade process is allowed to write checkpoint data.

In certain embodiments, providing dedicated write locations to each of the upgrade processes eliminates the writers race condition problem of the past when multiple upgrade processes would try to write to the same storage location (e.g., a common log) simultaneously. By providing dedicated write locations to the upgrade processes, as described above, each upgrade processes can write and store checkpoint data to its dedicated location without being affected by whether other upgrade processes are also writing their checkpoint data concurrently or in an overlapping manner temporarily. Assigning a dedicated location to each upgrade process for writing its respective checkpoint data mitigates problems when multiple upgrade processes need to access checkpoint data to the shared file storage at substantially the same time. When two or more upgrade processes try to access same checkpoint data in an overlapping manner in time, the situation may be called a race condition, i.e. the upgrade processes may race to access the checkpoint data. The race conditions and solutions provided for each condition by various embodiments are discussed below in connection with FIG. 2.

In certain embodiments, a hierarchical directory (or folder) structure may be provided by shared storage 150 for organizing the checkpoint data written by the various upgrade processes. For example, in one scenario, in the hierarchical directory structure, directories may be assigned to pods, with each having its own directory. A pod may comprise one or more hosts. Accordingly, a directory for a pod ("pod directory") may contain sub-directories for each of the hosts included in that pod. Accordingly, within each pod directory, a host subdirectory may be created for each host in that pod. Each host may locally execute one or more upgrade processes. Accordingly, within each host subdirectory, a process subdirectory may be created for each upgrade process executed by that host. In this manner, a hierarchical directory structure (representing a checkpoint data storage structure) may be created on shared storage 150 for the various pods, hosts, and upgrade processes involved in the overall upgrade. An example of such a data storage structure is discussed below with respect to FIG. 2.

Figure 2:
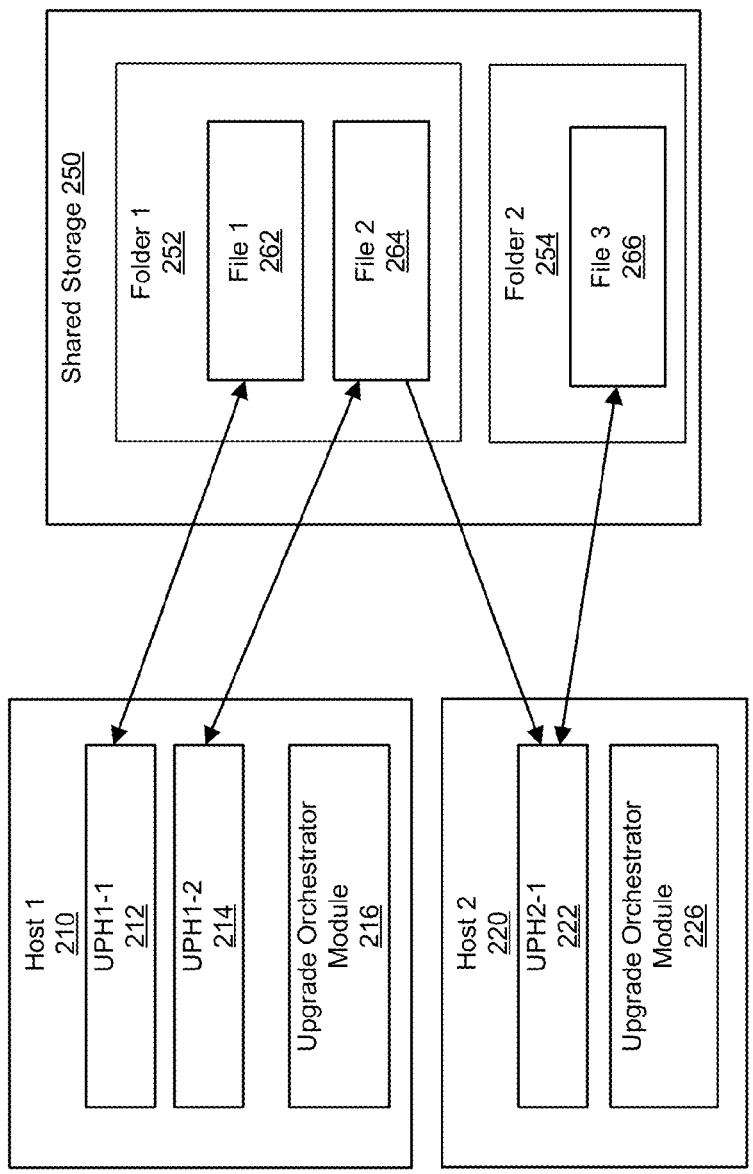
FIG. 2 depicts a shared storage for storing checkpoint data associated with multiple upgrade processes according to an embodiment of the present invention.

Referring now to FIG. 2, a first upgrade process 212 and a second upgrade process 214 may run on a first host 210 and a third upgrade process 222 may run on a second host 220. The first upgrade process 212 may be assigned a first location 262 (e.g. a first file) in a particular folder (Folder 1 252) on a shared storage 250 to write its checkpoint data. The second upgrade process 214 may be assigned a second location 264 (e.g. a second file) in Folder 252 on the shared storage 250 to write its checkpoint data. The third upgrade process 222 may be assigned a third location 266 (e.g. a third file) in a different folder (Folder 254) on the shared storage 250 to write its checkpoint data.

As provided above, a race condition occurs when two or more upgrade processes try to access same checkpoint data in an overlapping manner in time. For example, a first race condition may happen in conventional systems when two upgrade processes tries to write their respective checkpoint data to the shared storage at the same time. FIG. 2 illustrates how problems due to this first race condition can be mitigated by assigning a first location to the first upgrade process (e.g. assigning the first file 262 to the first upgrade process 212) and a second location to the second upgrade process (e.g. the second file 264 to the second upgrade process 264) for writing their respective checkpoint data. This way, both upgrade processes are allowed to write their respective checkpoint data to the shared storage 250 simultaneously or in any overlapping manner in time.

As shown in FIG. 2, the checkpoint data stored on the shared storage 250 is organized in a foldering system with a specific folder being assigned to each host. For example, the first host 210 may be assigned a first folder 252 and second host 212 is assigned a second folder 254. Within each folder, files are provided for the upgrade processes executed by the host represented corresponding to the folder for writing their checkpoint data. For example, in FIG. 2, within Folder 1 252 corresponding to host 210, a file 262 is provided and assigned to upgrade process 212 executed by host 210 and another file 264 is provided and assigned to upgrade process 212 also executed by host 210. Likewise, within Folder 2 254 corresponding to host 220, a file 266 is provided and assigned to upgrade process 222 executed by host 210. File 262 is the dedicated storage location for upgrade process 212, file 264 is the dedicated storage location for upgrade process 214, and file 266 is the dedicated storage location for upgrade process 222.

The files 262, 264, 266 on the shared storage 150 are thus organized in a hierarchical foldering or directory structure. For example, the hierarchical structure may be as follows: File 262: <shared filesystem>/release/host1/upgrade_process1/checkpoint_data File 264: <shared filesystem>/release/host1/upgrade_process2/checkpoint_data File 266: <shared filesystem>/release/host2/upgrade_process3/checkpoint_data.

The above hierarchical storage structure may ensure that each folder 252, 254 stores information for and represents states of the upgrade processes running on one host. Only the first upgrade process 212 running on the first host 210 can write checkpoint data to <shared filesystem>/release/host1/upgrade_process1/checkpoint_data. However, the first upgrade process 212 can still read checkpoint data stored under <shared filesystem>/release/host1/upgrade_process2/checkpoint_data, and <shared filesystem>/release/host2/upgrade_process3/checkpoint_data. In FIG. 2, the second upgrade process 214 may be the writer for the second file 264 and reader for files 262, 264 and 266 while the third upgrade process 222 may be the writer for the third file 266 and reader for files 262, 264 and 266.

In addition to the writers race problem mentioned above, another race condition may occur when a first upgrade process tries to read from a location in the shared storage while a second upgrade process tries to write checkpoint data to the same location. Using the embodiment depicted in FIG. 2 as an example, this type of second race condition may occur if the second upgrade process 214 and the third upgrade process 222 try to access the second file 264 simultaneously or in any overlapping manner in time, with third upgrade process 222 trying to access the second file 264 to read checkpoint data written to the file by upgrade process 214, and the second upgrade process 214 trying to access the second file 264 as a writer to write its checkpoint data to the file, i.e., the third upgrade process 222 tries to read checkpoint data from the second file 264 at the same time as the second upgrade process 214 is writing checkpoint data to the second file 264. This type of race condition may cause some unpredictable consequences. In one possible outcome, the third upgrade process 222 may not find any content in the second file 264 (e.g., an empty or null file) since the second upgrade process 214 has not finished writing its checkpoint data. In this race condition scenario, it is important to prevent the third upgrade process 222 from concluding that the second file 264 is "empty" or does not contain any checkpoint data. In some embodiments, upon determining an "empty" file, the third upgrade process 22 may even try to rename and/or discard the second file 264 due to lack of content. This should be prevented.

Various techniques may be used to solve the above-mentioned simultaneous writer-reader race problem. In certain embodiment, according to one technique, this may be achieved by setting the "reader" upgrade process, (e.g. third upgrade process 222 in FIG. 2) as a read-only upgrade process for all files not owned by that upgrade process (e.g., files 262 and 264 in FIG. 2). In this embodiment, each file (and the data stored therein) has a single owner upgrade process. Only the upgrade process that is the owner of the file (and the data stored therein) can write to that file or change/update the content of that file. A read-only upgrade process cannot (i.e., is not allowed to) rename or discard any files owned by another upgrade process regardless of whether the file contains checkpoint data or not (i.e., whether the file is deemed "empty" by the reader upgrade process or not).

Additionally, the upgrade process reading the file may be configured to retry reading the same file if the previous read attempt by the upgrade process resulted in the upgrade process getting an empty file. The time interval between the previous attempt and the retry attempt (i.e., the retry time interval) may be user-configurable and may be such that gives the writer process sufficient time to write the data to the file before the reader retries reading from that file. For example, in the embodiment depicted in FIG. 2, if third upgrade process 222 reads file 264 as being empty due to second upgrade process 214 trying to write to the file at the same time, third upgrade process 222 may try to re-read the file after a certain time interval. The certain time interval may provide enough time for second upgrade process 214 to complete writing its checkpoint data to file 264 such that when third upgrade process retries reading file 264 it now reads the checkpoint data written to file 264 by upgrade process 214.

According to various embodiments, upon the completion of each individual upgrade process, the upgrade infrastructure may automatically save current status of the entire system. At the end of the overall upgrade, a snapshot, i.e. a complete serialized image of the overall upgrade, may also be saved. For example, the complete serialized image of the overall upgrade may be generated using a serialization technology, such as Java serialization technology. The checkpoint may be a serialized Java object. To serialize an object may indicate converting the state of the object to a byte stream so that the byte stream can be reverted back into a copy of the object. At the end of the overall upgrade, each application instance may serialize the states of all individual upgrade processes, and the byte streams may be saved in the snapshot files on the file system, i.e. a complete serialized image of the overall upgrade may be saved and reused later by desterilizing the serialized image. Embodiments of the present invention may automatically archive the complete images of checkpoint data upon the completion of the overall upgrade to a backup location.

In certain embodiments, an upgrade process may be a multi-threaded upgrade process. For multi-threaded upgrade processes, multiple prevalence layer instances may be used to write data to the shared storage 250 to the location assigned to that upgrade process. For example, each upgrade thread in the given upgrade process may run its own prevalence layer instance to write data to assigned location assigned on the shared storage 250. Conventional systems cannot guarantee data integrity if two or more prevalence layer instances run concurrently. In contrast, embodiments use the prevalence layer instances to coordinate two or more multi-threaded upgrade processes to guarantee persistence by allowing, at any given point, only the prevalence layer instance started by a given upgrade process to write its checkpoint data. That is, two "writing" prevalence layer instances cannot work on the same set of checkpoint data at the same time. Preventing two "writing" prevalence layer instances from working on the same set of checkpoint data at the same time eliminates writing conflicts of the first race condition.

Figure 3:
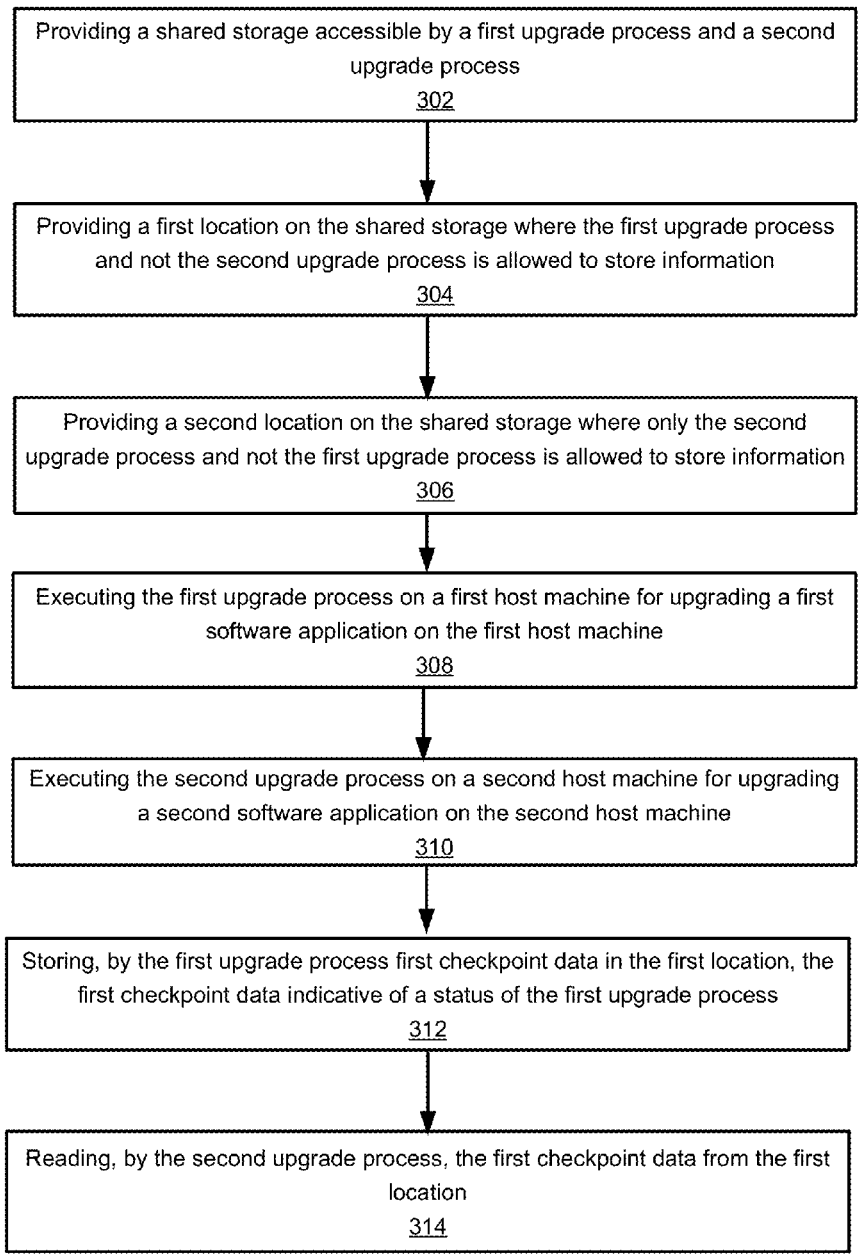
FIG. 3 depicts a simplified flowchart depicting processing performed by an upgrade console for coordinating execution of multiple upgrade processes on multiple hosts according to an embodiment of the present invention.

FIG. 3 depicts a simplified flowchart 300 depicting a method performed by the upgrade infrastructure for executing multiple upgrade processes on multiple hosts as part of an overall upgrade according to an embodiment of the present invention. The processing depicted in FIG. 3 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIG. 3 is not intended to be limiting. In one embodiment, the processing depicted in FIG. 3 is performed by one or more components of the upgrade infrastructure 100 depicted in FIG. 1. Further, for purposes of simplicity, the processing depicted in FIG. 3 is described in the context of two upgrade processes. This is however not intended to be limiting. The teachings of FIG. 3 can be applied to more than two upgrade processes.

The processing in flowchart 300 may be defined in terms of steps that are performed during the design time and steps that are performed during the run-time of the upgrade processes. During design time, the upgrade processes may be assigned to various hosts, the shared storage may be setup such that a dedicated location is assigned to each upgrade process. In some embodiments, the design time may encompass activities occurring prior to the upgrade processes start execution. The run-time may mark the end of the design time. At least one of the upgrade processes may start executing/running at run-time.

During the design time, at 302, a shared storage accessible by a first upgrade process and a second upgrade process is provided. The first upgrade process may be configured to run on a first host machine, and the second upgrade process may be configured to run on a second host machine. Alternatively, both the first upgrade process and the second upgrade process may be configured to run on the same host machine. The shared storage may be provided on a central host machine that is accessible by both the first upgrade process and the second upgrade process. In an exemplary embodiment, the shared storage may be provided on one of the first host machine or the second host machine.

Still during the design time, at 304, a first location on the shared storage is provided and assigned to the first upgrade process, the first location being a memory location where the first upgrade process and not the second upgrade process is allowed to store information such as the first upgrade process' checkpoint data. Similarly at 306, a second location on the shared storage is provided and assigned to the second upgrade process, the second location being a memory location where only the second upgrade process and not the first upgrade process is allowed to store information such as the second upgrade process' checkpoint data. A dedicated location allows only a specific upgrade process, and not the other upgrade processes, to write to and store information on this dedicated location.

For a location assigned to an upgrade process, only that upgrade process is allowed to modify the contents of the dedicated location. For example, embodiments may ensure that the path of each storage location can uniquely identify one upgrade process. The path (e.g. address or location identifier of the dedicated storage location) may include identifying information for the upgrade process such as the release including the upgrade process, the type of host where the upgrade process is running, the phase of the upgrade process, etc. For example, the path may be in the form of "<release>/<hostname>/<upgrade_type>/<upgrade_phase>". For an upgrade to release 11.1.7.0.0 on a business intelligence (BI) host 'abc' in a phase of installing languages, embodiments may generate the path of the dedicated storage location as: "./11.1.7.0.0/abc/BI/downtimeLP/". Accordingly, each upgrade process may have its own unique storage location.

Embodiment further provide a "write/read-only" mode for accessing the storage location. Only one "writing" access may be allowed to any particular storage location across all individual upgrade processes. In some embodiments, an upgrade process may access its dedicated storage location via a prevalence layer instance. As discussed above, each upgrade process may create multiple prevalence layer instances accessing its own storage location or storage locations assigned to other upgrade process to coordinate the overall upgrade as well as the individual upgrade processes. Embodiments ensure that each individual upgrade process can create one and only one "writing" prevalence layer instance that accesses its own storage location. Embodiments allows each individual upgrade process to create multiple "read-only" prevalence layer instances to access storages of other upgrade processes. Hence, no upgrade process can modify the contents of transaction data generated by another upgrade process using the "read-only" prevalence layer instances. In certain embodiments, this may be regulated by an upgrade console (e.g., upgrade console 104 depicted in FIG. 1). For example, the upgrade console may prevent the second upgrade process from modifying the content and/or attributes of the first location assigned to the first upgrade process. Similarly, the upgrade console may prevent the first upgrade process from modifying the content and/or attributes of the second location assigned to the second upgrade process.

Runtime processing start at 308. During runtime, as part of an overall upgrade, at 308, the first upgrade process may be executed on the first host machine for upgrading a first software application on the first host machine and, at 310, the second upgrade process may be executed on the second host machine for upgrading a second software application on the second host machine. The first upgrade process and the second upgrade process may generate checkpoint data at various time points during their execution. The checkpoint data for each upgrade process may include information indicative of a status of that upgrade process at the time when the checkpoint data is generated and written by the upgrade process.

At 312, the first upgrade process stores first checkpoint data generated by the first upgrade process in the first location on the shared storage. The first checkpoint data may include information indicative of a status or progress of the first upgrade process at the time when the first checkpoint data is generated and written by the first upgrade process.

In some instances, the first checkpoint data written by the first upgrade process may later be used by the first upgrade process, i.e. the same upgrade process. For example, the execution of the first upgrade process may be paused at a first execution point. The first upgrade process may then read the first checkpoint data at the first execution point from the first location. The execution of the first upgrade process may then resume from the first execution point using the first checkpoint data or a portion thereof read by the first upgrade process from the first location. This process is discussed below in greater detail in connection with FIG. 4.

At 314, the second upgrade process may read the first checkpoint data from the first location. An execution of the second upgrade process may be modified using the first checkpoint data. For example, the execution of the second upgrade process may be paused to read the first checkpoint data. In some embodiments, the execution of the second upgrade process may be halted based on the first checkpoint data, for example until the first upgrade process reaches a predetermined checkpoint.

Similarly, the second upgrade process may store second checkpoint data generated by the second upgrade process in the second location on the shared storage. The second checkpoint data may include information indicative of a status or progress of the second upgrade process at the time when the second checkpoint data is generated and written by the second upgrade process. During the upgrade, the first upgrade process may read the second checkpoint data from the second location. That is, the upgrade console may allow the first upgrade process to access (e.g. provide a read-access to) the second checkpoint data.

According to various embodiments, the present invention provides recovery solutions during upgrade failures. For example, upon running in recover mode, processes succeeded in a previous attempt may be skipped in a subsequent attempt. Thus, the checkpoints may be used to determine which processes already succeeded and which ones failed. Alternatively or in addition, a standalone utility to check and update orchestration status may be provided. For example, predetermined users, such as admin users, may manually fix or execute certain processes, and use the standalone utility to update checkpoint and rerun orchestration in a recover mode.

Figure 4:
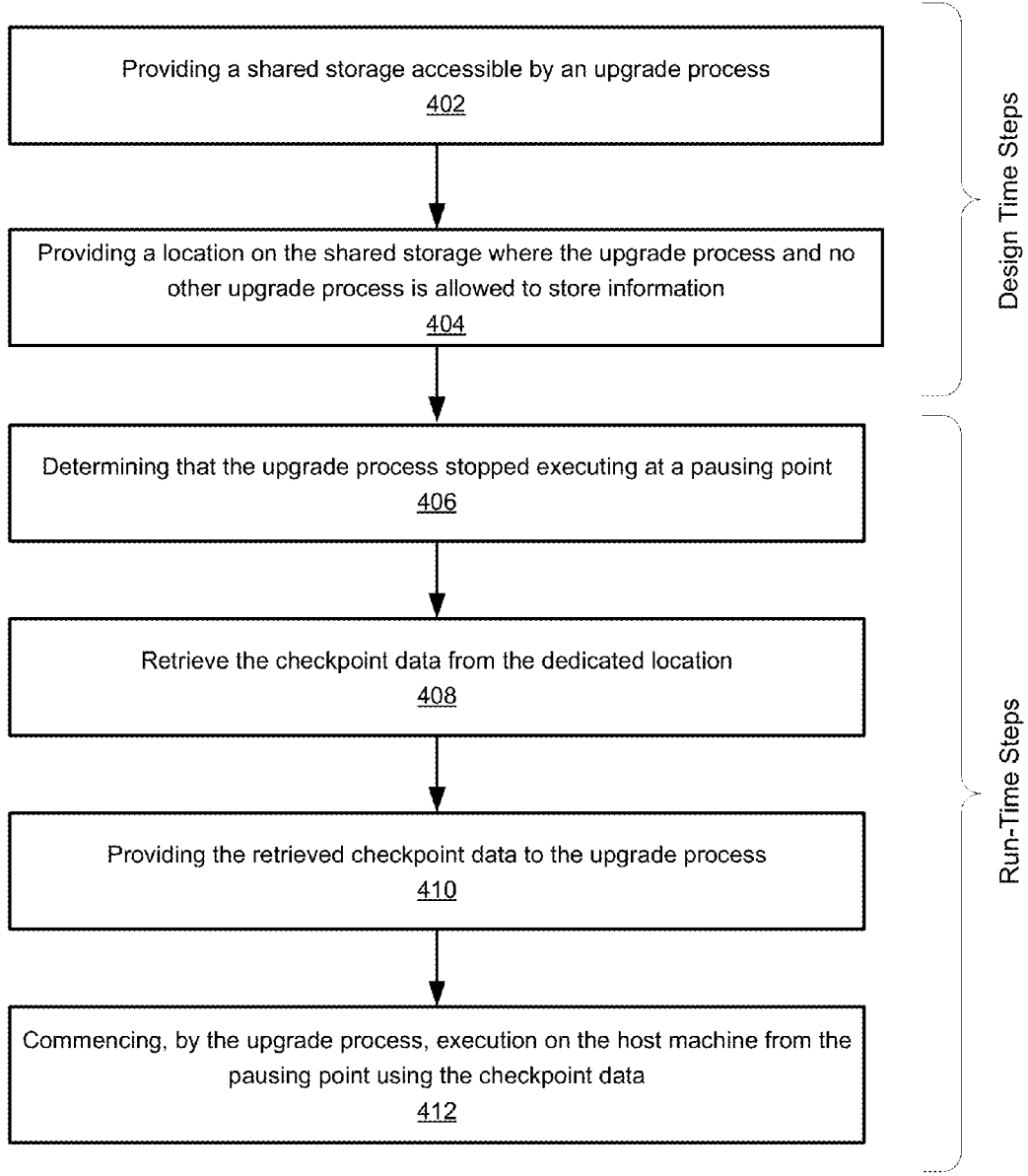
FIG. 4 depicts a simplified flowchart depicting processing performed by a first upgrade process to commence execution from a pausing point using checkpoint data according to an embodiment of the present invention.

Referring now to FIG. 4, a simplified flowchart 400 is provided to depict processing performed by a first upgrade process to commence execution from a pausing point using checkpoint data according to an embodiment of the present invention. The processing depicted in FIG. 4 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIG. 4 is not intended to be limiting. In one embodiment, the processing depicted in FIG. 4 is performed by one or more components of the upgrade infrastructure 100 depicted in FIG. 1.

The processing in flowchart 400 may be defined in terms of steps that are performed during the design time and steps that are performed during the run-time of the upgrade processes. During the design time, at 402, a shared storage accessible by an upgrade process is provided. The shared storage may be provided on a central host machine that is accessible by the upgrade process. In an exemplary embodiment, the shared storage may be provided on a host machine where the upgrade process executes.

Still during the design time, at 404, a location on the shared storage is provided where the upgrade process and no other upgrade process is allowed to store information, such as checkpoint data. The upgrade process may be allowed to modify the content of the location assigned to the upgrade process. For example, the upgrade console may prevent any other upgrade process from modifying the content and/or attributes of the location dedicated to the upgrade process.

Similarly, the upgrade console may prevent the upgrade process from modifying the content and/or attributes of other locations on the shared memory.

The run-time steps of the flowchart 400 may include, at 406, determining that the upgrade process stopped executing on the host machine at a pausing point. For example, an error may have occurred during execution or the upgrade process may have stopped to wait for other upgrade processes to execute up to a predetermined checkpoint.

It may be desirable for the upgrade process to resume execution from the pausing point and avoid re-executing the upgrade activities and/or processes that have been successfully completed up to the pausing point. At 408 and 410, the upgrade console may retrieve the checkpoint data from the dedicated location and provide the retrieved checkpoint data to the upgrade process. As provided above, the checkpoint data saved at or up to the pausing point includes information indicative of a progress status of the upgrade process at the pausing point. Thus, using the checkpoint data, the upgrade process may resume execution from where the execution was paused/stopped. At 412, the upgrade process may commence execution on the host machine from the pausing point, using the checkpoint data that is retrieved from the dedicated location.

As provided above, a first race condition may happen when two upgrade processes (e.g. the first upgrade process 212 and the second upgrade process 216 in FIG. 2) try to write their respective checkpoint data to the shared storage at the same time. This first race condition and steps to avoid problems due to the first race condition are discussed next in connection with FIG. 5.

Figure 5:
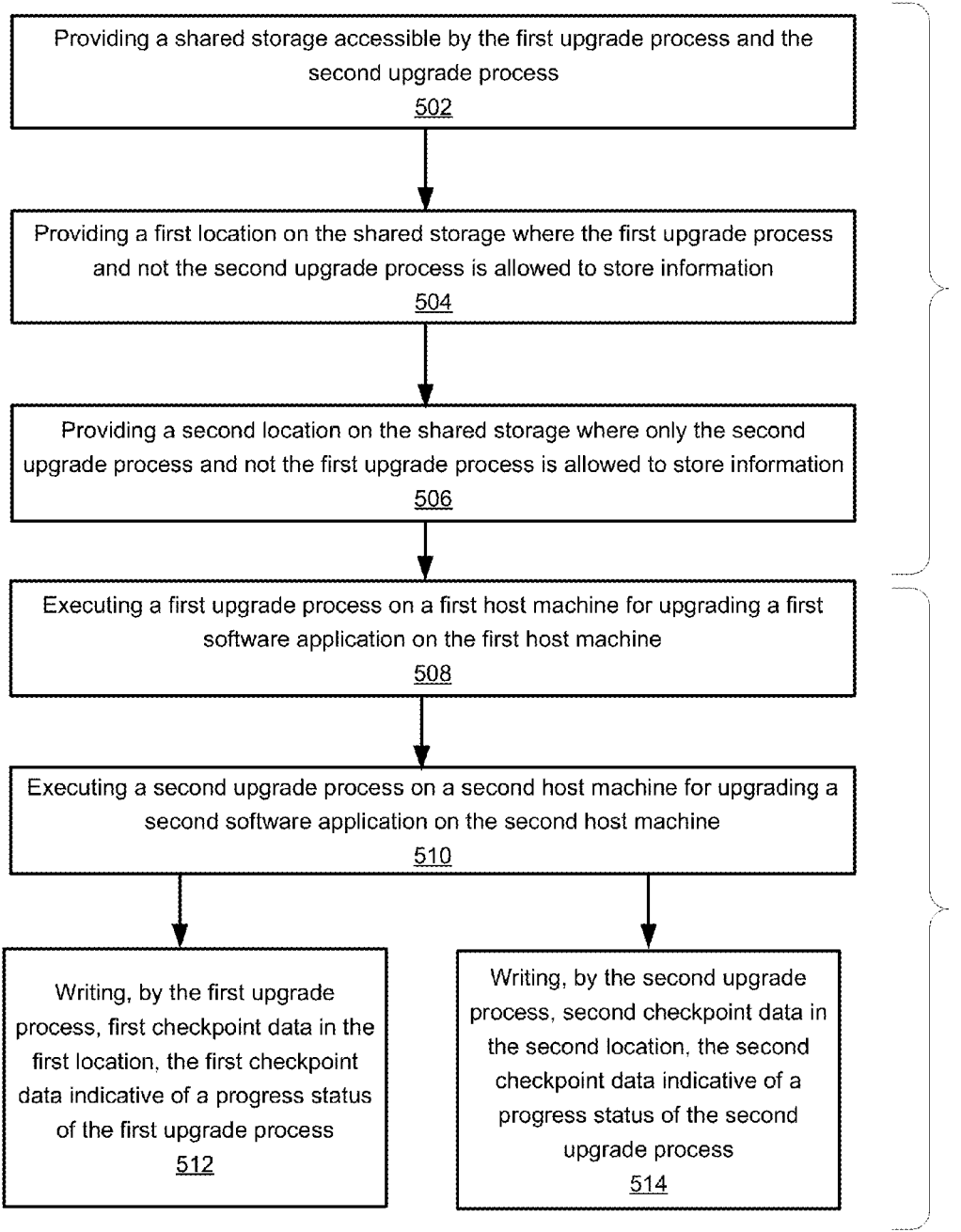
FIG. 5 depicts a simplified flowchart depicting processing performed by a first upgrade process and a second upgrade process to write checkpoint data to the shared storage.

FIG. 5 depicts a simplified flowchart 500 depicting processing performed by a first upgrade process and a second upgrade process to write checkpoint data to the shared storage. The processing depicted in FIG. 5 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIG. 5 is not intended to be limiting. In one embodiment, the processing depicted in FIG. 5 is performed by one or more components of the upgrade infrastructure 100 depicted in FIG. 1.

The processing in flowchart 500 may be defined in terms of steps that are performed during the design time and steps that are performed during the run-time of the upgrade processes. During the design time, at 502, a shared storage accessible by a first upgrade process and a second upgrade process is provided. The shared storage may be provided on a central host machine that is accessible by both the first upgrade process and the second upgrade process. In an exemplary embodiment, the shared storage may be provided on one of the first host machine where the first upgrade process runs or the second host machine where the second upgrade process runs, and may be accessible by the first upgrade process and the second upgrade process.

Still during the design time, at 504, a first location on the shared storage is provided where the first upgrade process and not the second upgrade process is allowed to store information. Similarly at 506, a second location on the shared storage is provided where only the second upgrade process and not the first upgrade process is allowed to store information. A dedicated location for each one of the first upgrade process and the second upgrade process may be provided on the shared storage for storing the checkpoint data generated by that upgrade process. A dedicated location allows only a specific process, and not the other processes, to write to and store information on this dedicated location. For example, only the first upgrade process, and not the other upgrade processes, can write to and store information on the dedicated location for the first process. Each upgrade process may be allowed to modify the content of the dedicated location assigned to that upgrade process. For example, the upgrade console may prevent the second upgrade process from modifying the content and/or attributes of the first location. Similarly, the upgrade console may prevent the first upgrade process from modifying the content and/or attributes of the second location.

At 508, the run-time steps are initiated by executing the first upgrade process on the first host machine for upgrading a first software application on the first host machine. Similarly, at 510, the second upgrade process is executed on the second host machine for upgrading a second software application on the second host machine. The first upgrade process and the second upgrade process may generate checkpoint data at various time points during their execution. The checkpoint data for each upgrade process may include information indicative of a status of that upgrade process when the checkpoint data is generated.

The first upgrade process and the second upgrade process may generate checkpoint data during their execution. At 512 and 514, the first upgrade process may write first checkpoint data to the shared storage and the second upgrade process may write second checkpoint data to the shared storage. The checkpoint data for each upgrade process may include information indicative of a status of that upgrade process. Steps 512 and 514 may overlap in time. In certain embodiments, steps 512 and 514 may be simultaneous or may occur substantially at the same time. In other embodiments, steps 512 and 514 may simply overlap without necessarily starting at the same time. At 512, the first upgrade process writes the first checkpoint data to the first location on the shared storage. At 514, the second upgrade process writes the second checkpoint data to second location on the shared storage. Thus, problems due to the first race condition may be mitigated by assigning the first location to the first upgrade process and the second location to the second upgrade process for each upgrade process to write their respective checkpoint data. This way, both upgrade processes are allowed to write their respective checkpoint data to the shared storage at the same time. Each upgrade process may be allowed to modify the content and/or attributes of the dedicated location assigned to that upgrade process. For example, the upgrade console may prevent the second upgrade process from modifying the content and/or attributes of the first location. Similarly, the upgrade console may prevent the first upgrade process from modifying the content and/or attributes of the second location.

As provided above, a second race condition may occur when a first upgrade process tries to access a location on the shared storage as writer while a second upgrade process try to access the same location as reader. That is, the second upgrade process may try to read checkpoint data from a location while the first upgrade process is writing its checkpoint data to the same location. Thus, the second upgrade process may not find any content in the location before the first upgrade process finishes writing the data. This second race condition and steps to avoid problems due to the second race condition are discussed next in connection with FIG. 6.

Figure 6:
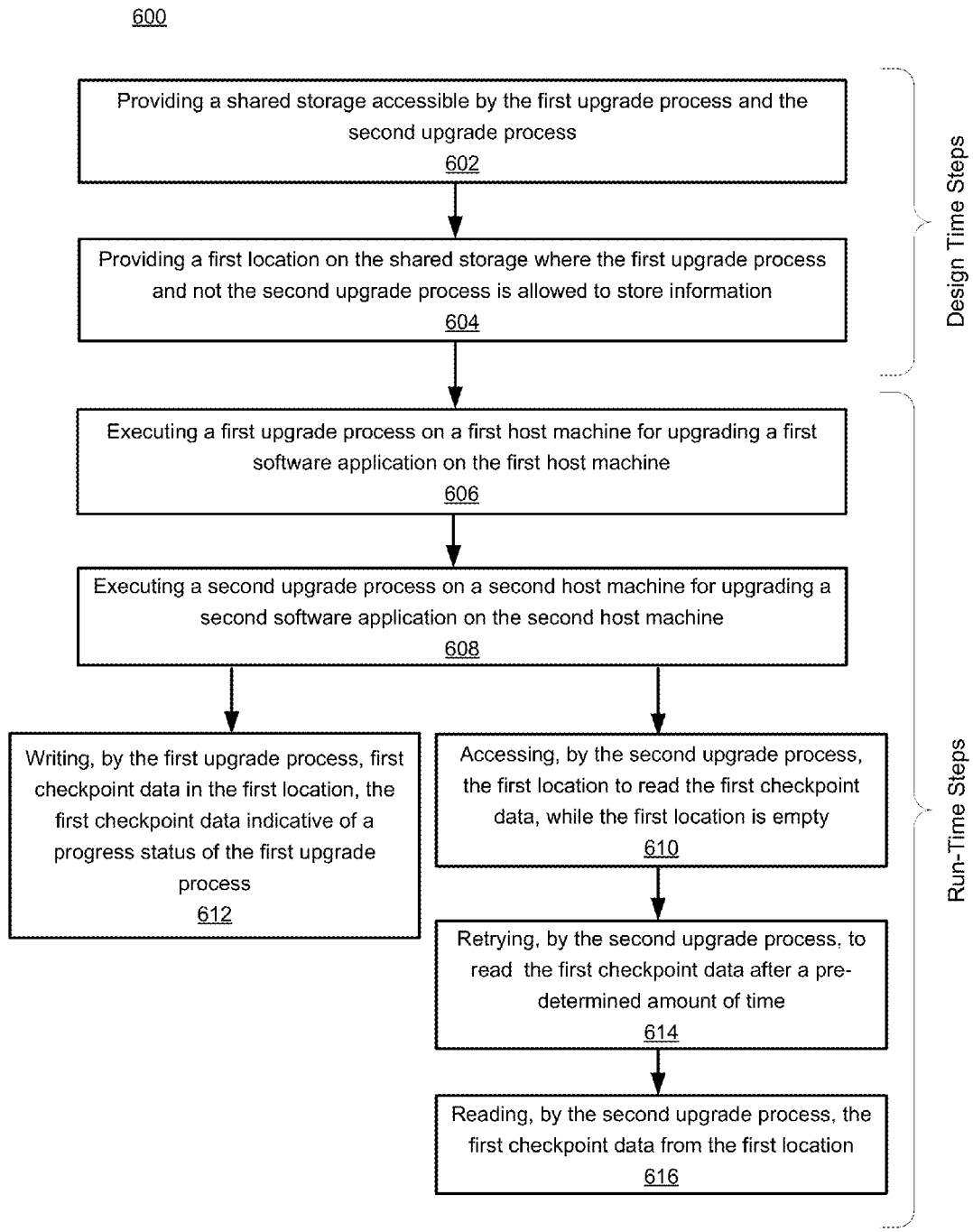
FIG. 6 depicts a simplified flowchart depicting processing performed by a first upgrade process writing checkpoint data from a file and a second upgrade process reading checkpoint data to the same file.

FIG. 6 depicts a simplified flowchart depicting processing performed by a first upgrade process reading checkpoint data from a file and a second upgrade process writing checkpoint data to the same file. The processing depicted in FIG. 6 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIG. 6 is not intended to be limiting. In one embodiment, the processing depicted in FIG. 6 is performed by one or more components of the upgrade infrastructure 100 depicted in FIG. 1.

The processing in flowchart 600 may be defined in terms of steps that are performed during the design time and steps that are performed during the run-time of the upgrade processes. During the design time, at 602, a shared storage accessible by a first upgrade process running on a first host machine and a second upgrade process running on a second host machine is provided. The shared storage may be provided on a central host machine that is accessible by both the first upgrade process and the second upgrade process. In an exemplary embodiment, the shared storage may be provided on one of the first host machine or the second host machine, and may be accessible by the first upgrade process and the second upgrade process.

The first upgrade process and the second upgrade process may generate checkpoint data during their execution. The checkpoint data may include information indicative of a status of the upgrade process. Still during the design time, at 604, a first location on the shared storage is provided where the first upgrade process and not the second upgrade process is allowed to store information. A dedicated location allows only a specific process, and not the other processes, to write to and store information on this dedicated location. For example, only the first upgrade process, and not the other upgrade processes, can write to and store information on the dedicated location for the first process. Each upgrade process may be allowed to modify the content of the dedicated location assigned to that upgrade process. For example, the upgrade console may prevent the second upgrade process from modifying the content and/or attributes of the first location.

At 606, the run-time steps are initiated by executing the first upgrade process on the first host machine for upgrading a first software application on the first host machine. Similarly, at 608, the second upgrade process is executed on the second host machine for upgrading a second software application on the second host machine. The first upgrade process and the second upgrade process may generate checkpoint data at various time points during their execution. The checkpoint data for each upgrade process may include information indicative of a status of that upgrade process when the checkpoint data is generated.

At 610, the second upgrade process may access the first location on the shared storage to the read the first checkpoint data. However, if the first upgrade process did not yet write information on the first location, the first location may be deemed to be "empty". For example, the first upgrade process may be in process of writing information to the first location. Alternatively, the first upgrade process may not have started writing the information to the first location at the time the second upgrade process accesses the first location as a reader. The read access to an empty location forms the basis of the second race condition. In this second race condition scenario, it is important to prevent the first dedicated location to be deemed as "empty" and renamed and/or discarded due to lack of content, i.e. checkpoint data, by the second upgrade process. This may be achieved by assigning an "owner" upgrade process to each location on the shared storage and by setting the "reader" upgrade process as a read-only upgrade process for all files not owned by that upgrade process. Each file (and the data stored therein) has a single owner upgrade process. Only the owner upgrade process of the file (and the data stored therein) can write to the file or change/update the state of that upgrade process. A read-only upgrade process cannot (i.e. is not allowed to) rename/discard any files owned by another upgrade process regardless of whether the file contains checkpoint data.

Accordingly, when the second upgrade process accesses the first location (while the first location is empty) at 610, the second upgrade process is not allowed to modify the content or attributes of the first location. The second upgrade process may wait for a pre-determined amount of time before retying reading checkpoint data from the first location.

At 612, the first upgrade process writes the first checkpoint data in the first location. The first checkpoint data may be indicative of a progress status of the first upgrade process. At a point in time later than step 610 (i.e. a pre-determined amount of time after step 610), the second upgrade process retries reading the first checkpoint data from the first location. If the first upgrade process is done writing the first checkpoint data in the first location, at 616, the second upgrade process reads the first checkpoint data from the first location. Thus, problems due to the second race condition may be mitigated by assigning the first upgrade process as the owner of the first dedicated location and preventing the second upgrade process from modifying the content of the first dedicated location.

Accordingly, embodiments enable multiple software applications potentially running on multiple hosts to be upgraded using checkpoints. The checkpoints allow for upgrade processes executing on the various hosts to be synchronized, if needed, with upgrade processes executing on other hosts. The checkpoint data may be used to restart the execution of an upgrade process from a pausing point. Thus, the checkpointing prevents repeating the successfully completed processes of an upgrade process. Embodiments further enable each upgrade process running on a host to read checkpoint data from a shared storage and/or write its checkpoint data to a dedicated checkpoint file stored on the shared storage. The dedicated checkpoint storage technique allow to prevent race conditions that may arise when two or more upgrade processes try to access the same storage location to read and/or write checkpoint data.

Figure 7:
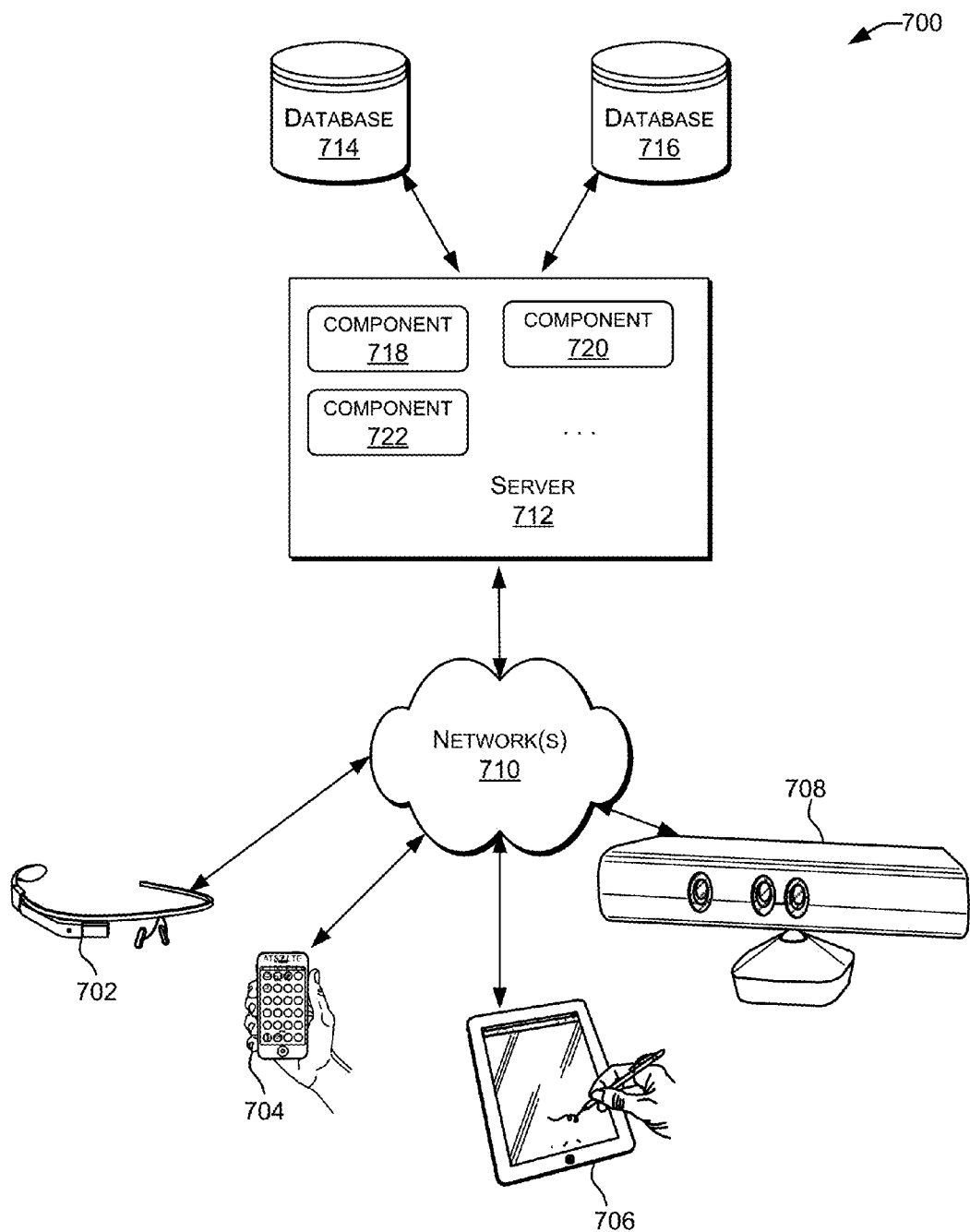
FIG. 7 depicts a simplified diagram of a distributed system for implementing one of the embodiments.

FIG. 7 depicts a simplified diagram of a distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
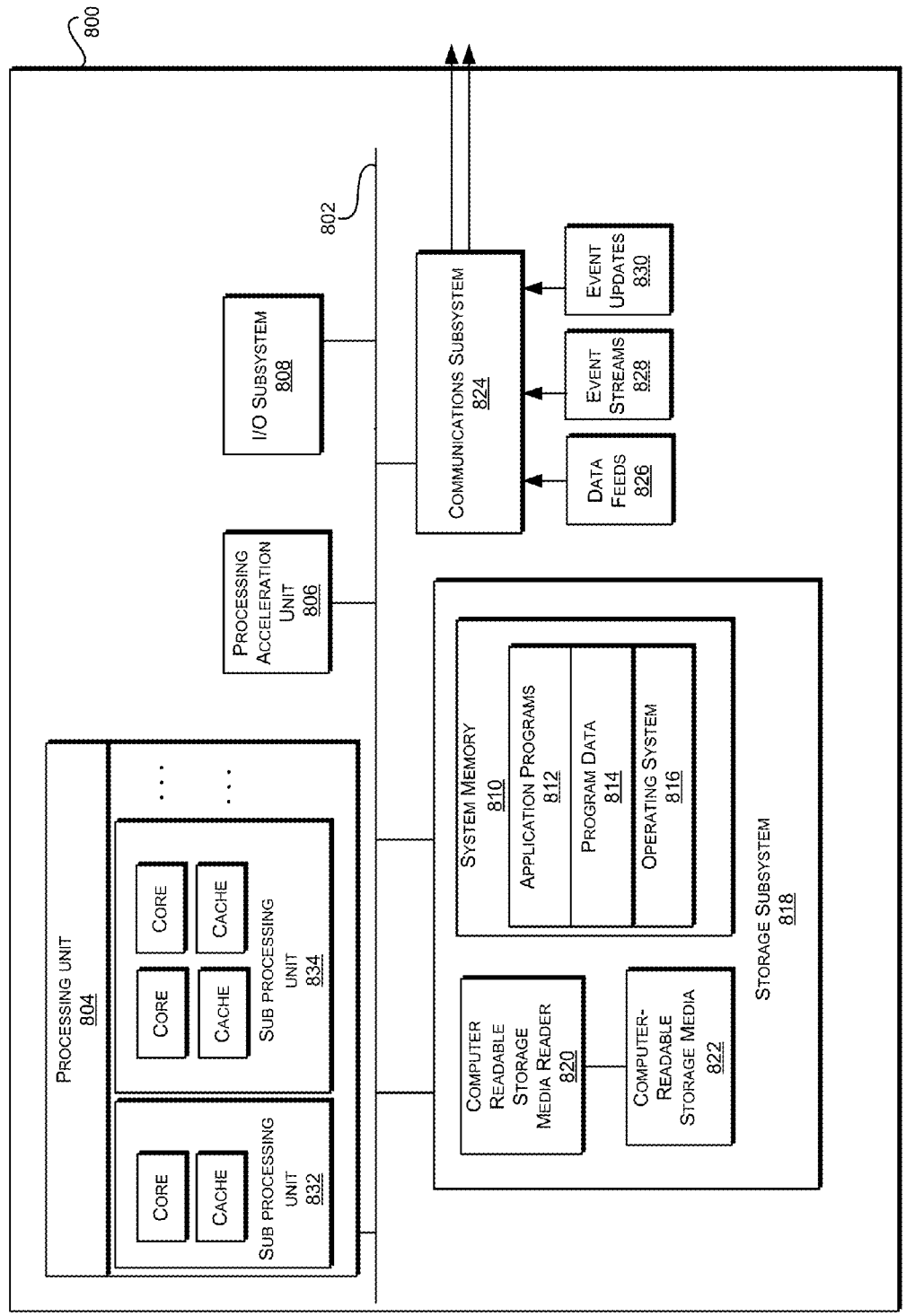
FIG. 8 illustrates an exemplary computer system that may be used to implement an embodiment of the present invention.

FIG. 8 illustrates an exemplary computer system 800, in which various embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   causing, by an upgrade console, execution of a first upgrade process on a first host machine for upgrading a first software application on the first host machine;
   causing execution of a second upgrade process on a second host machine for upgrading a second software application on the second host machine;
   providing a shared storage accessible by the first upgrade process and the second upgrade process;
   providing a first location on the shared storage for the first upgrade process where the first upgrade process and not the second upgrade process is allowed to store information, wherein the first location is readable by the second upgrade process;

storing, by the first upgrade process, first checkpoint data in the first location, the first checkpoint data indicative of a status of the first upgrade process; and reading, by the second upgrade process, the first checkpoint data from the first location.

2. The method of claim 1, further comprising:

modifying execution of the second upgrade process based on the first checkpoint data.

3. The method of claim 2, wherein the modifying further comprises:

pausing the execution of the second upgrade process until the first upgrade process reaches a pre-determined checkpoint.

4. The method of claim 1, wherein the shared storage is provided on the first host machine or the second host machine.

5. The method of claim 1, wherein the shared storage is provided on a third machine different than the first host machine and the second host machine.

6. The method of claim 1, further comprising:

determining, by the upgrade console, that the execution of the first upgrade process is stopped at a first execution point;

retrieving a portion of the first checkpoint data from the first location, wherein the portion of the first checkpoint data is generated at the first execution point; and providing, to the first upgrade process, the portion of the first checkpoint data generated at the first execution point, wherein the first upgrade process resumes execution from the first execution point based on the retrieved portion of the first checkpoint data.

7. The method of claim 1, further comprising:

storing, at a second location corresponding to the second upgrade process on the shared storage, second checkpoint data generated by the second upgrade process, the second checkpoint data comprising information indicative of a status of the second upgrade process, wherein the second upgrade process and not the first upgrade process is allowed to store information in the second location.

8. The method of claim 7, further comprising:

preventing the second upgrade process from modifying contents or attributes of the first location; and preventing the first upgrade process from modifying contents or attributes of the second location.

9. The method of claim 7, further comprising:

reading, by the first upgrade process, the second checkpoint data from the second location.

10. A non-transitory computer-readable medium comprising one or more instructions stored thereon, that when executed on one or more processors, cause the one or more processors to perform a method comprising:

executing a first upgrade process on a first host machine for upgrading a first software application on the first host machine;

executing a second upgrade process on a second host machine for upgrading a second software application on the second host machine;

storing, by the first upgrade process, at a first location on a shared storage, first checkpoint data, the first checkpoint data indicative of a status of the first upgrade process, wherein the shared storage is accessible by the first upgrade process and the second upgrade process, wherein the first upgrade process and not the second upgrade process is allowed to store information in the first location, and wherein the first location is readable by the second upgrade process; and reading, by the second upgrade process, the first checkpoint data from the first location.

11. The non-transitory computer-readable medium of claim 10, wherein the method further comprises:

modifying execution of the second upgrade process based on the first checkpoint data.

12. The non-transitory computer-readable medium of claim 11, wherein the modifying comprises:

pausing the execution of the second upgrade process until the first upgrade process reaches a pre-determined checkpoint.

13. The non-transitory computer-readable medium of claim 10, wherein the shared storage is provided on the first host machine or the second host machine.

14. The non-transitory computer-readable medium of claim 10, wherein the shared storage is provided on a third machine different than the first host machine and the second host machine.

15. The non-transitory computer-readable medium of claim 10, wherein the method further comprises:

determining that the execution of the first upgrade process is stopped at a first execution point;

retrieving a portion of the first checkpoint data from the first location, wherein the portion of the first checkpoint data is generated at the first execution point;

providing, to the first upgrade process, the portion of the first checkpoint data generated at the first execution point; and resuming the execution of the first upgrade process from the first execution point based on the retrieved portion of the first checkpoint data.

16. The non-transitory computer-readable medium of claim 10, wherein the method further comprises:

storing, at a second location corresponding to the second upgrade process on the shared storage, second checkpoint data generated by the second upgrade process, the second checkpoint data comprising information indicative of a status of the second upgrade process, wherein the second upgrade process and not the first upgrade process is allowed to store information in the second location.

17. The non-transitory computer-readable medium of claim 16, wherein the method further comprises:

preventing the second upgrade process from modifying contents or attributes of the first location; and preventing the first upgrade process from modifying contents or attributes of the second location.

18. The non-transitory computer-readable medium of claim 16, wherein the method further comprises:

providing, to the first upgrade process, the second checkpoint data from the second location.

19. The non-transitory computer-readable medium of claim 10, wherein the method further comprises:

granting access, by the second upgrade process, to the first location to read the first checkpoint data before the first upgrade process writes the first checkpoint data to the first location, wherein the second upgrade process determines that the first location is empty;

preventing the second upgrade process from modifying an attribute of the first location to indicate that the first location is empty; and granting re-access, by the second upgrade process, to the first location to read the first checkpoint data after a pre-determined amount of time, wherein the second upgrade process reads the first checkpoint data after the first upgrade process finishes writing the first checkpoint data to the first location.

20. A system comprising:
a first host machine configured to execute a first upgrade process for upgrading a first software application on the first host machine;
a second host machine configured to execute a second upgrade process for upgrading a second software application on the second host machine; and
a shared storage accessible by the first upgrade process and the second upgrade process, the shared storage comprising a location where the first upgrade process and not the second upgrade process is allowed to store information and the information in the location is readable by the second upgrade process, the location storing first checkpoint data indicative of a status of the first upgrade process, wherein the second upgrade process reads the first checkpoint data from the location.

* * * * *

UNITED STATES PATENT AND TRADEMARK OFFICE
CERTIFICATE OF CORRECTION

PATENT NO. : 9,785,427 B2  
APPLICATION NO. : 14/838184  
DATED : October 10, 2017  
INVENTOR(S) : Hu et al.

Page 1 of 1

It is certified that error appears in the above-identified patent and that said Letters Patent is hereby corrected as shown below:

In Column 1, Line 49, delete "prevalyler" and insert -- prevayler --, therefor.

In Column 13, Line 12, delete ""./11" and insert -- "../11 --, therefor.

In Column 19, Line 56, delete "infra-red" and insert -- infrared --, therefor.

In Column 19, Line 65, delete "UNIXO" and insert -- UNIX® --, therefor.

Signed and Sealed this  
Twenty-ninth Day of May, 2018

Andrei Iancu  
*Director of the United States Patent and Trademark Office*